(12) United States Patent
Siegfried et al.

(10) Patent No.: US 6,692,027 B2
(45) Date of Patent: Feb. 17, 2004

(54) LOAD LIMITING SEAT RESTRAINT RETRACTOR

(75) Inventors: Kenneth John Siegfried, Clarkston, MI (US); James Lloyd Webber, Shelby Township, MI (US); David Gerard Hlavaty, Northville, MI (US); George Rodney Kohut, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 160 days.

(21) Appl. No.: 09/975,705

(22) Filed: Oct. 11, 2001

(65) Prior Publication Data

US 2003/0071452 A1 Apr. 17, 2003

(51) Int. Cl.[7] .............................................. B60R 22/04
(52) U.S. Cl. ........................................ 280/805; 280/806
(58) Field of Search ............................. 280/801.1, 802, 280/803, 805, 806, 807, 808; 242/379.1

(56) References Cited

U.S. PATENT DOCUMENTS

| | | |
|---|---|---|
| 5,526,996 A | 6/1996 | Enber et al. |
| 5,547,143 A | 8/1996 | Miller, III et al. |
| 5,628,469 A | 5/1997 | Föhl |
| 5,636,806 A | 6/1997 | Sayles |
| 5,687,925 A | 11/1997 | Sayles |
| 5,772,144 A | 6/1998 | Tanabe et al. |
| 5,794,877 A | 8/1998 | Ono et al. |
| 5,820,058 A | 10/1998 | Hirzel et al. |
| 5,823,570 A * | 10/1998 | Lane et al. ................. 280/806 |
| 5,938,135 A | 8/1999 | Sasaki et al. |
| 5,954,287 A | 9/1999 | Hirase |
| 5,961,060 A | 10/1999 | Brambilla et al. |
| 5,967,441 A * | 10/1999 | Kohlndorfer et al. ..... 242/379.1 |
| 5,984,223 A | 11/1999 | Hiramatsu |
| 6,029,924 A | 2/2000 | Ono et al. |
| 6,047,914 A * | 4/2000 | Sasaki ...................... 242/379.1 |
| 6,131,843 A | 10/2000 | Singer et al. |
| 6,186,432 B1 * | 2/2001 | Koning .................... 242/379.1 |
| 6,216,972 B1 | 4/2001 | Röhrle |
| 6,264,127 B1 * | 7/2001 | Blackadder et al. ...... 242/379.1 |
| 6,299,091 B1 * | 10/2001 | Blackadder et al. ...... 242/379.1 |
| 6,360,980 B1 | 3/2002 | Lee |
| 6,367,729 B1 * | 4/2002 | Inagawa et al. .......... 242/379.1 |
| 6,419,178 B1 * | 7/2002 | Kohlndorfer et al. ..... 242/379.1 |
| 6,481,660 B2 * | 11/2002 | Nagata et al. ........... 242/379.1 |

* cited by examiner

Primary Examiner—Paul N. Dickson
Assistant Examiner—Toan C To
(74) Attorney, Agent, or Firm—Scott A. McBain (57) ABSTRACT

A load limiting seat restraint retractor for a seat restraint system in a vehicle includes a housing for operative connection to vehicle structure. The load limiting seat restraint retractor also includes a take-up spool operatively connected to the housing and connected to webbing of a seat restraint system for winding and unwinding the webbing. The load limiting seat restraint retractor also includes a rotatable torsion bar operatively connected to the housing to provide a constant load limiting on the webbing during an impact. The take-up spool is mounted on the torsion bar. The load limiting seat restraint retractor includes a locking mechanism operatively connected to the torsion bar and the housing. The load limiting seat restraint retractor further includes a load limiting device disposed between the locking mechanism and the take-up spool to deform the take-up spool to provide digressive load limiting on the webbing during the impact.

20 Claims, 5 Drawing Sheets

LOAD LIMITING SEAT RESTRAINT RETRACTOR

TECHNICAL FIELD

The present invention relates generally to seat restraint systems for vehicles and, more particularly, to a load limiting seat restraint retractor for a seat restraint system in a vehicle.

BACKGROUND OF THE INVENTION

It is known to provide a seat restraint system such as a seat belt in a vehicle to restrain an occupant in a seat of the vehicle. In some vehicles, the seat restraint system may be a lap belt, a shoulder belt, or both. Typically, the lap belt and shoulder belt are connected together at one end. The seat restraint system includes a latch plate at the connected end. The seat restraint system also includes a buckle connected at one end by webbing or the like to vehicle structure. The buckle receives the latch plate to be buckled together. When the buckle and latch plate are buckled together, the seat restraint system restrains movement of the occupant to help protect the occupant during a collision.

It is also known to provide a load limiting retractor for the seat restraint system. During a front impact, the load limiting retractor locks and rapid deceleration causes forward movement of the occupant and the occupant to load the seat restraint webbing. These load limiting retractors are used to payout or unspool seat restraint webbing under a constant load and allow the occupant to decelerate with the vehicle, thus limiting high seat restraint loads, thereby improving occupant performance. However, these load limiting retractors typically offer one level of load limiting.

It is desirable to limit the amount of restraint load on an occupant during an impact for a seat restraint system in a vehicle. It is also desirable to provide a load limiting mechanism for a seat restraint retractor of a seat restraint system in a vehicle. It is further desirable to provide multiple levels of load limiting for various size occupants during an impact in a seat restraint system of a vehicle that uses a minimal number of parts for a mechanical device.

SUMMARY OF THE INVENTION

It is, therefore, one object of the present invention to provide a new load limiting seat restraint retractor for a seat restraint system in a vehicle.

It is another object of the present invention to provide a load limiting seat restraint retractor for a seat restraint system in a vehicle that achieves multi-level load limiting.

It is yet another object of the present invention to provide a load limiting seat restraint retractor for a seat restraint system in a vehicle that is mechanical and uses a minimal number of parts.

To achieve the foregoing objects, the present invention is a load limiting seat restraint retractor for a seat restraint system in a vehicle including a housing for operative connection to vehicle structure. The load limiting seat restraint retractor also includes a take-up spool operatively connected to the housing and connected to webbing of a seat restraint system for winding and unwinding the webbing. The load limiting seat restraint retractor further includes a torsion bar operatively connected to the housing to provide a constant load limiting on the webbing during an impact. The take-up spool is mounted on the torsion bar. The load limiting seat restraint retractor includes a locking mechanism operatively connected to the torsion bar and the housing. The load limiting seat restraint retractor includes a load limiting device disposed between the locking mechanism and the take-up spool to deform locally to provide digressive load limiting on the webbing during an impact.

One advantage of the present invention is that a load limiting seat restraint retractor is provided for a seat restraint system in a vehicle. Another advantage of the present invention is that the load limiting seat restraint retractor achieves multi-level load limiting and provides the desired effect of digressive load limiting. Yet another advantage of the present invention is that the load limiting seat restraint retractor offers a high peak load and digresses to a lower load level, thereby reducing the restraint load to a $5^{th}$ percentile female. Still another advantage of the present invention is that the load limiting seat restraint retractor is a mechanical device for digressive load limiting using a minimal number of parts and cost.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
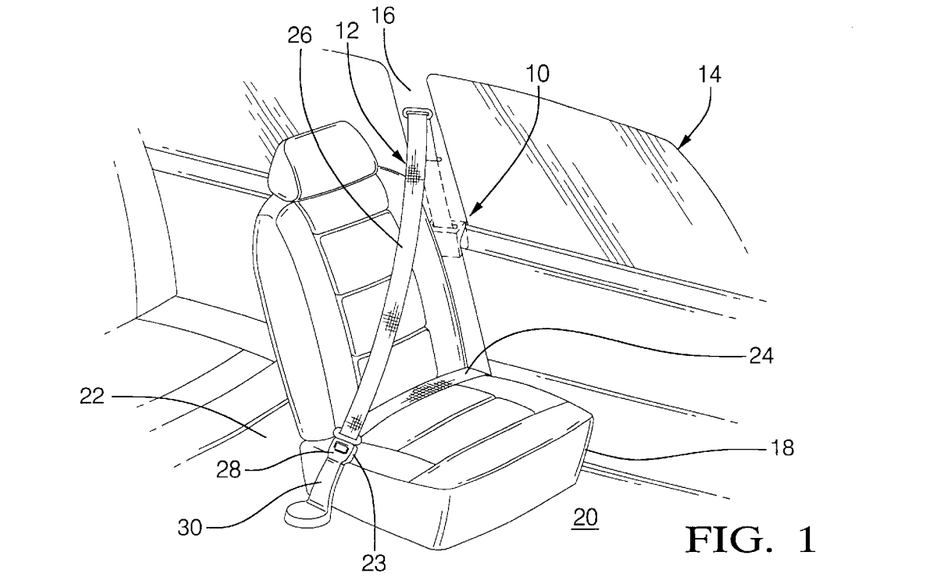
FIG. 1 is a perspective view of a load limiting seat restraint retractor, according to the present invention, illustrated in operational relationship with a seat restraint system of a vehicle.

Referring to the drawings and in particular FIG. 1, one embodiment of a load limiting seat restraint retractor 10, according to the present invention, is shown for a seat restraint system, generally indicated at 12, in a vehicle (partially shown), generally indicated at 14. The vehicle 14 includes a vehicle body 16 and a seat 18 mounted by suitable means to vehicle structure 20 such as a floorpan in an occupant compartment 22 of the vehicle body 16. In this embodiment, the seat 18 is a front seat of the vehicle 14. It should be appreciated that the seat 18 could be a rear, second row or third row seat for the vehicle 14.

The vehicle 14 includes the seat restraint system 12 for restraining an occupant (not shown) in the seat 18. The seat restraint system 12 includes a latch tongue or plate 23 connected to an end of either one of a lap belt 24, shoulder belt 26, or both which have another end connected to the load limiting seat restraint retractor 10. The seat restraint system 12 also includes a buckle assembly 28 connected by suitable means such as belt webbing 30 to the vehicle structure 20. The latch plate 23 is engageable and disengageable with the buckle assembly 28 as is known in the art. It should be appreciated that, except for the load limiting seat restraint retractor 10, the seat restraint system 12 and vehicle 14 are conventional and known in the art.

Figure 2:
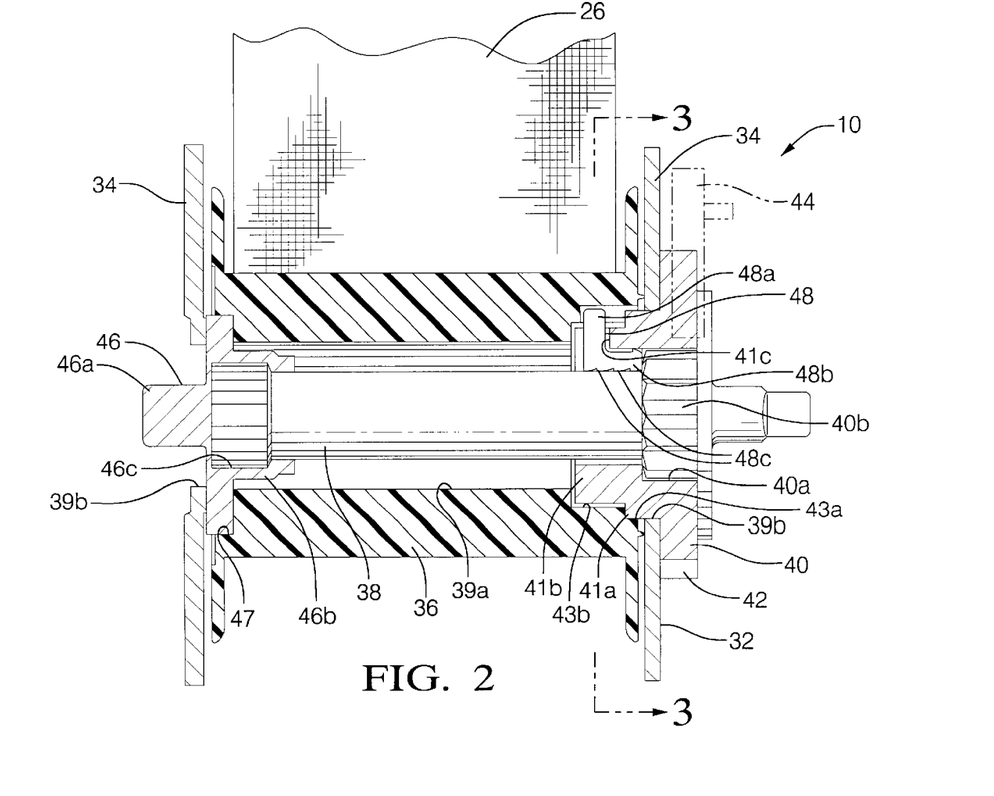
FIG. 2 is a fragmentary elevational view of the load limiting seat restraint retractor of FIG. 1.
Figure 3:
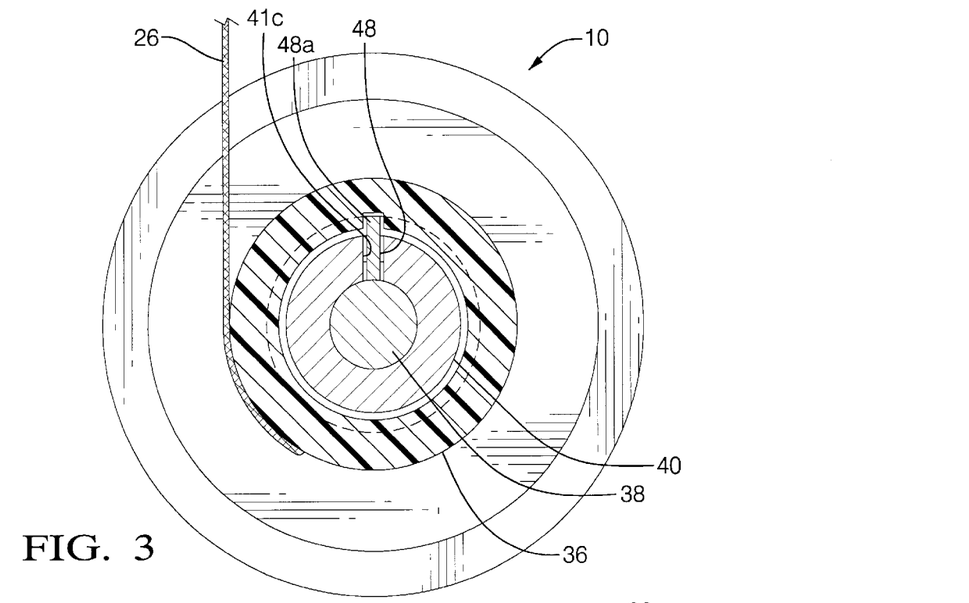
FIG. 3 is a sectional view taken along line 3—3 of FIG. 2.

Referring to FIGS. 2 and 3, the load limiting seat restraint retractor 10, according to the present invention, is connected, in one embodiment, to the shoulder belt 26. The load limiting seat restraint retractor 10 includes a housing 32 having a base wall (not shown) and spaced apart sidewalls 34. The load limiting seat restraint retractor 10 also includes a belt reel or take-up spool 36 disposed between the sidewalls 34 and connected by suitable means such as an adhesive to the end of the shoulder belt 26. The load limiting seat restraint retractor 10 also includes a torsion bar or shaft 38 extending through a passageway 39a of the take-up spool 36 and an aperture 39b of the sidewalls 34 of the housing 32 such that the torsion bar 38 and the take-up spool 36 are rotatable relative to the housing 32. The torsion bar 38 is a constant force limiting member that deforms inside the take-up spool 36, thus absorbing energy. It should be appreciated that the housing 32 is attached by suitable means (not shown) to either the vehicle body 16 or the seat 18. It should also be appreciated that the webbing of the shoulder belt 26 is connected to and wrapped around the take-up spool 36.

The load limiting seat restraint retractor 10 also includes a ratchet or inertia disc 40 rigidly attached to and disposed about one end of the torsion bar 38. The ratchet 40 is generally circular in shape and has a plurality of teeth 42 disposed circumferentially thereabout for a function to be described. The ratchet 40 has an annular recess 40a therein to receive an enlarged portion 40b of the torsion bar 38 to allow the torsion bar 38 and ratchet 40 to rotate together as a unit. It should be appreciated that the torsion bar 38 is staked into the ratchet 40.

The ratchet 40 also has first flange 41a extending axially. The first flange 41a is annular and of a reduced diameter to extend axially into a first recess 43a in one end of the take-up spool 36 to allow the take-up spool 36 and ratchet 40 to rotate together as a unit. The ratchet 40 also has a second flange 41b extending axially from the first flange 41a. The second flange 41b is annular and of a reduced diameter than the first flange 41a to extend axially into second recess 43b in the same end of the take-up spool 36 as the first recess 43a. The second flange 41b includes a slot 41c having a general "L" shape therein. The slot 41c extends axially and radially into the ratchet 40 and radially into the take-up spool 36 for a function to be described. It should be appreciated that the teeth 42 are disposed outside of the sidewall 34 and that the flanges 41a and 41 be extend through the aperture 39b in the sidewall 34. It should also be appreciated that the ratchet 40 is made of a rigid material such as metal and is integral, unitary, and one-piece.

The load limiting seat restraint retractor 10 includes an inertia latch or locking pawl 44 for engaging the teeth 42 on the ratchet 40. The locking pawl 44 is pivotally connected to a sidewall 34 of the housing 32 by suitable means such as a pin (not shown). The load limiting seat restraint retractor 10 includes a spring (not shown) disposed about the pin and interconnecting the locking pawl 44 and the housing 32 to urge the locking pawl 44 away from the ratchet 40. It should be appreciated that the locking pawl 44 and spring are conventional and known in the art.

The load limiting seat restraint retractor 10 includes an inertia member or "standing man" (not shown) disposed in an inertia housing (not shown) connected by suitable means to the housing 32. The load limiting seat restraint retractor 10 also includes a lever (not shown) operatively connected to the support member and cooperating with the locking pawl 44. Upon receiving an inertia force, the standing man pivots to move the lever and actuate the locking pawl 44 to engage the teeth 42 on the ratchet 40 to prevent payout of the shoulder belt 26. It should be appreciated that the ratchet 40, locking pawl 44, inertia latch support member, standing man, inertia housing, and lever are conventional and known in the art.

The load limiting seat restraint retractor 10 further includes a nut 46 connected to the other end of the torsion bar 38. The nut 46 is generally circular in shape and has a shaft portion 46a extending through the aperture 39b in the sidewall 34 for connection to a retractor spring (not shown) for a function to be described. The nut 46 has a flange 46b extending axially. The flange 46b is annular and of a reduced diameter to extend axially into a recess 47 in the other end of the take-up spool 36 to allow the take-up spool 36 and nut 46 to rotate together as a unit. The flange 46b has a recess 46c for receiving the other end of the torsion bar 38. Preferably, the nut 46 is staked onto the end of the torsion bar 38 and staked into the take-up spool 36. It should be appreciated that, as webbing is pulled out off of the take-up spool 36, the nut 46, torsion bar 38, and take-up spool 36, and ratchet 40 rotate together as a single unit.

The load limiting seat restraint retractor 10 also includes a retractor spring (not shown) disposed about the shaft portion 46a of the nut 46. The retractor spring is of a spiral type having one end attached to the shaft portion 46a of the nut 46 and another end connected to the housing 32 as known in the art. The retractor spring may be enclosed by a spring housing (not shown) attached to the sidewall 34 of the housing 32. The retractor spring has a predetermined torque or tension and urges the nut 46, torsion bar 38, and take-up spool 36 in a predetermined direction to wind up the shoulder belt 26 on the take-up spool 36. It should be appreciated that the retractor spring is conventional and known in the art.

The load limiting seat restraint retractor 10 further includes a load limiting device such as a key 48. In one embodiment, the key 48 is generally "L" shaped. The key 48 has a first portion 48a extending radially in the slot 41c and into the recess 43b of the take-up spool 36. The key 48 has a second portion 48b extending axially into the slot 41c of the ratchet 40 between the flange 41b and the torsion bar 38. The key 48 has a plurality of teeth 48c on the second portion 48b and spaced axially therealong to engage the torsion bar 38 to allow the torsion bar 38 and key 48 to rotate together as a unit. The key 48 is pressed into a slot 41c in the ratchet 40. It should be appreciated that the take-up spool 36 fits over the torsion bar 38 and the slot 41c fits over the key 48. It should be appreciated that, in another embodiment, a pin (not shown) corresponding to the first portion 48a of the key may replace the key 48.

Figure 4:
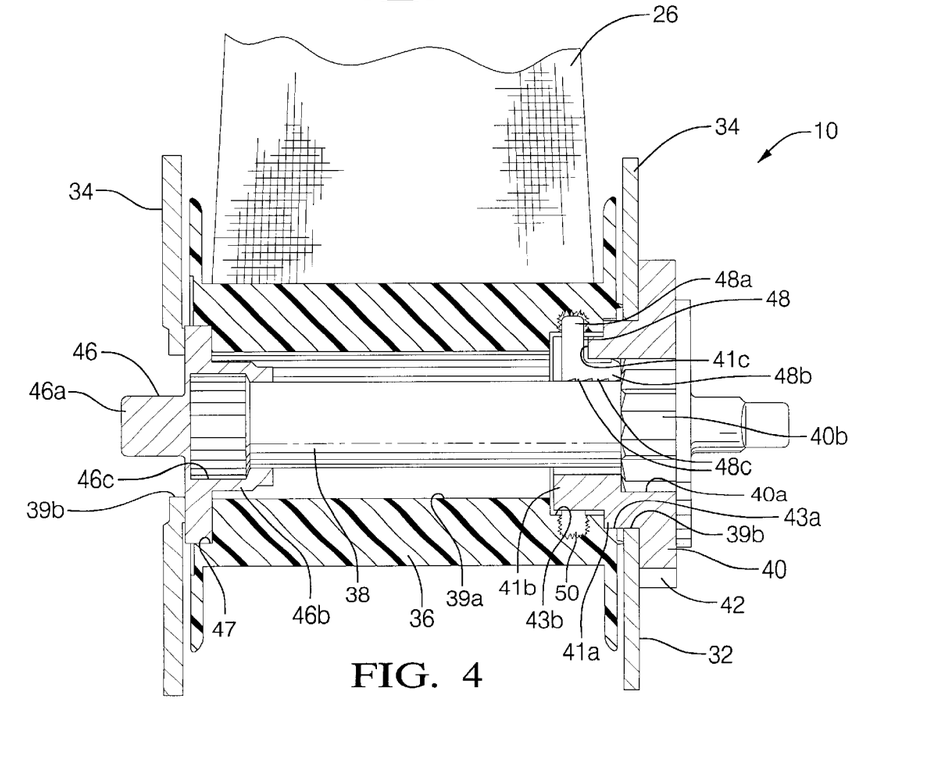
FIG. 4 is a fragmentary elevational view of the load limiting seat restraint retractor of FIG. 1 illustrating a first operational state.
Figure 5:
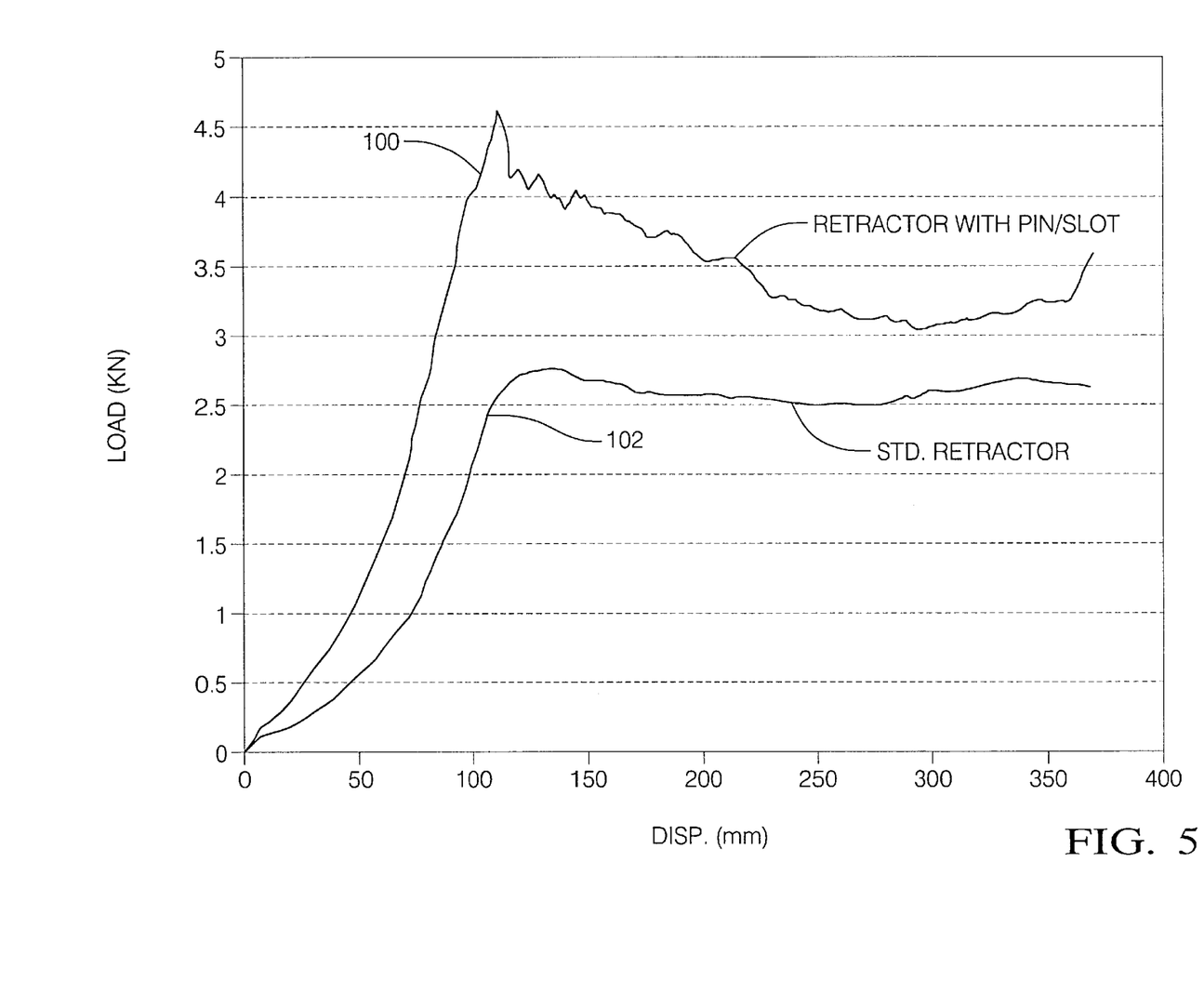
FIG. 5 is a graph of load versus displacement for the load limiting seat restraint retractor of FIG. 1.

In operation of the load limiting seat restraint retractor 10, an occupant (not shown) grasps the latch plate 23 and pulls on the lap belt 24 and shoulder belt 26. The shoulder belt 26 is unwound by the occupant from the take-up spool 36. The occupant engages the latch plate 23 with the buckle assembly 28 to restrain the occupant in the seat 18. When the vehicle 14 experiences a frontal impact or collision-indicating condition of at least a predetermined threshold level, the rapid deceleration causes the occupant to move forward and place a load on the webbing attached to the load limiting seat restraint retractor 10. As a result, the seat restraint retractor 10 locks and the locking pawl 44 is activated by the inertia locking and engages the ratchet 40. As webbing is pulled off the take-up spool 36, the nut 46, torsion bar 38, and take-up spool 36 rotate together and cause twisting and deformation of the torsion bar 38. Relative motion will occur between the take-up spool 36, key 48, and the ratchet 40. Since relative motion occurs between the key 48 and the take-up spool 36, the key 48 will cause deformation and dig a "groove" 50 on an inside bearing surface of the take-up spool 36 as illustrated in FIG. 4. Deformation of the torsion bar 38 and the take-up spool 36 results in a higher peak load for approximately one revolution of the take-up spool 36 as shown by the curve 100 for the load limiting seat restraint retractor 10 as compared to the curve 102 for a standard conventional load limiting retractor (not shown) in the graph of FIG. 5. As the take-up spool 36 continues to rotate, the load will decrease as the key 48 reduces the amount of deformation to the take-up spool 36. It should be appreciated that the load limiting seat restraint retractor 10 has digressive load limiting to payout seat belt webbing and allow the occupant to decelerate with the vehicle 14.

Figure 6:
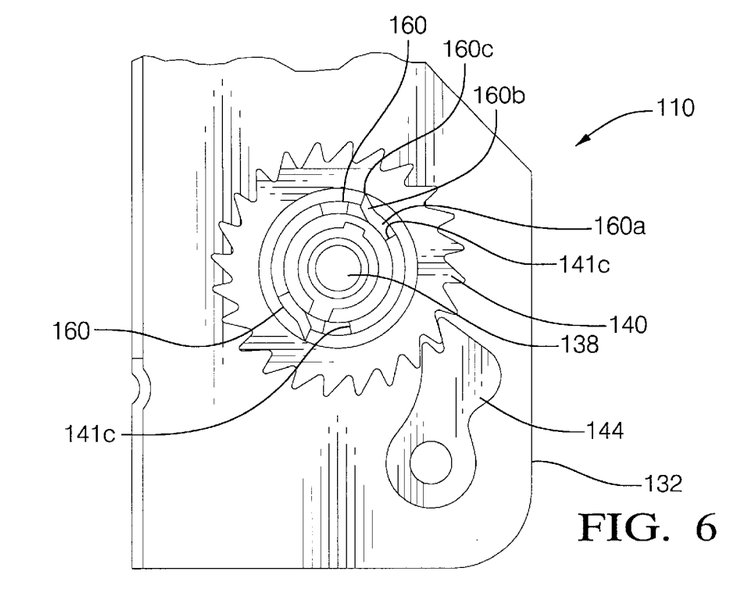
FIG. 6 is a side elevational view of another embodiment, according to the present invention, of the load limiting seat restraint retractor of FIG. 1.
Figure 7:
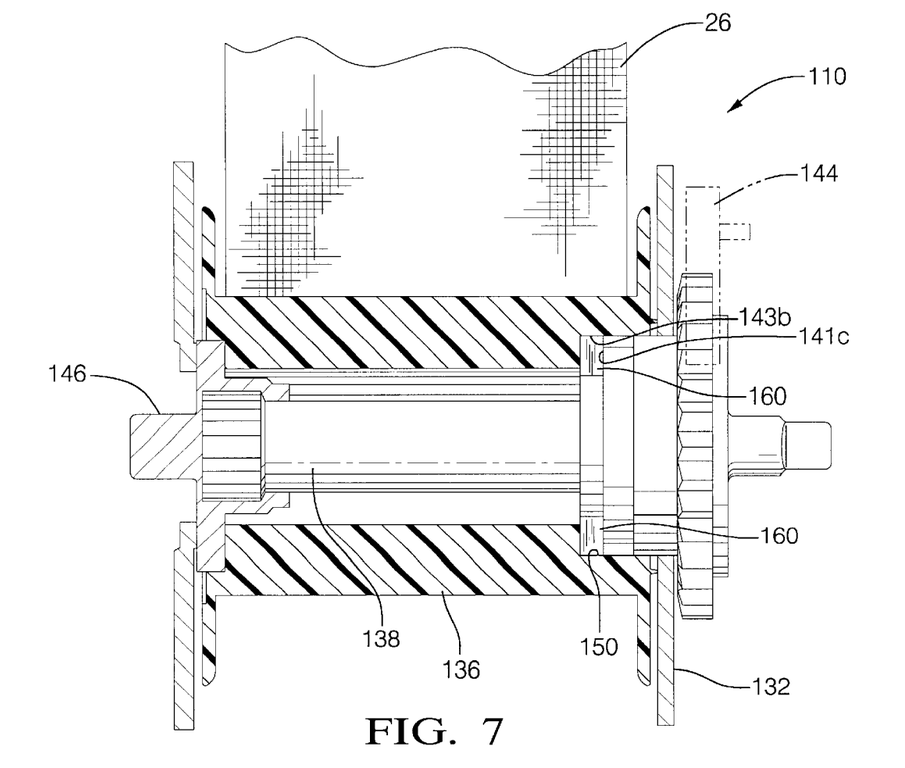
FIG. 7 is a fragmentary elevational view of the load limiting seat restraint retractor of FIG. 6.

Referring to FIGS. 6 and 7, another embodiment, according to the present invention, of the load limiting seat restraint retractor 10 is shown. Like parts of the load limiting seat restraint retractor 10 have like reference numerals increased by one hundred (100). In this embodiment, the load limiting seat restraint retractor 110 includes the housing 132, take-up spool 136, torsion bar 138, ratchet 140, locking pawl 144, and nut 146. The load limiting seat restraint retractor 110 also includes a load limiting device such as at least one cutter 160. In one embodiment, the load limiting device is two symmetrically opposed cutters 160 with different heights. The cutters 160 have a first portion 160a extending circumferentially into the slot 141c of the ratchet 140. The cutters 160 have a second portion 160b extending radially in the slot 141c and into the recess 143b of the take-up spool 136. The cutters 160 have a cutting edge 160c having a generally inverted "V" shape at the end of the second portion 160b. The cutters 160 are pressed into their respective slots 141c in the ratchet 140. It should be appreciated that the take-up spool 136 fits over the torsion bar 138 and the slot 141c fits over the cutters 160. It should be appreciated that one of the cutters 160 has a cutting edge 160c with a radial height greater or higher than the other cutter, which is the only cutter 160 engaged with the take-up spool 136. It should also be appreciated that, in another embodiment, (not shown) the two opposed cutters 160 may be replaced with a single cutter 160 having a generally "L" shaped similar to the key 48.

Figure 8:
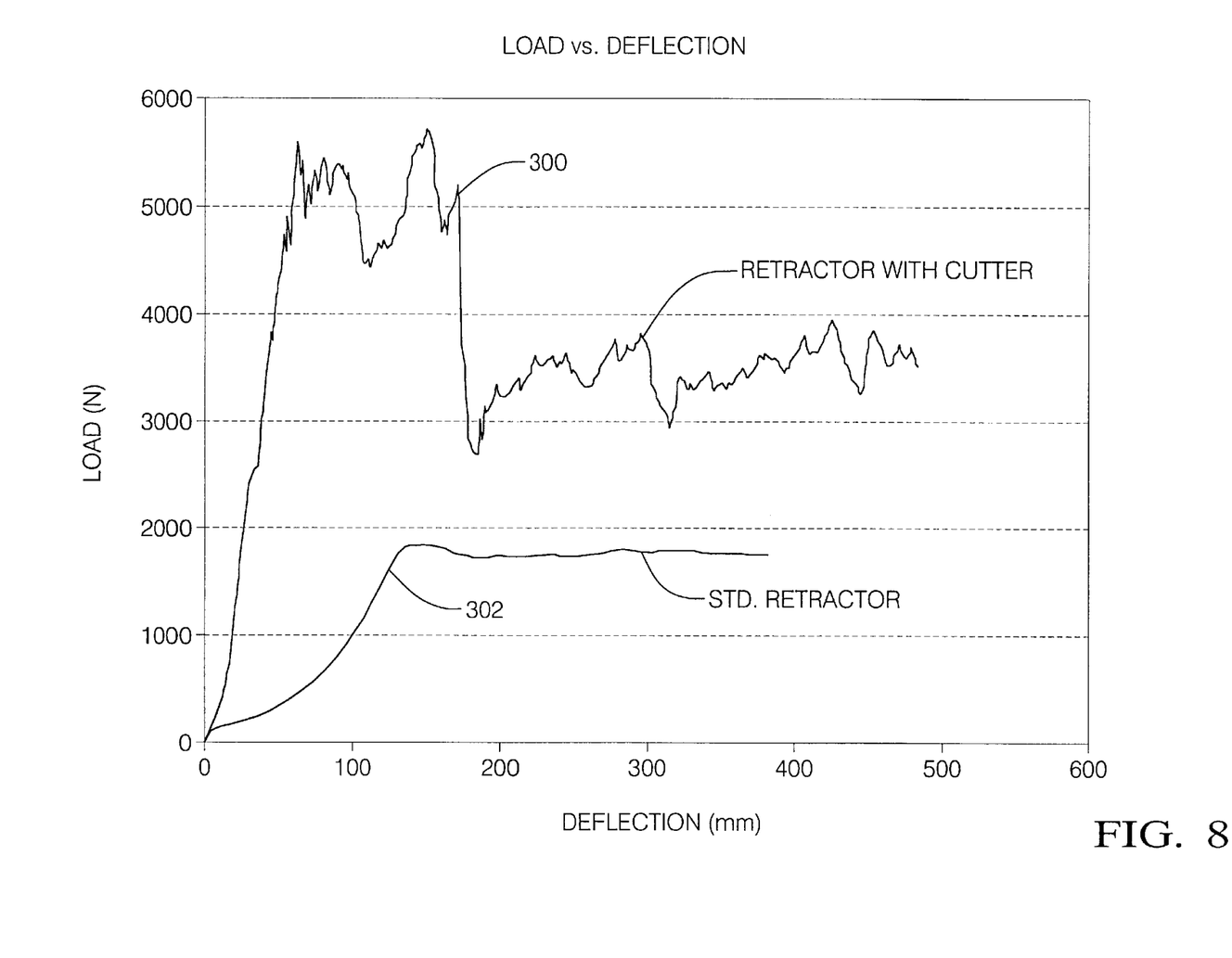
FIG. 8 is a graph of load versus displacement for the load limiting seat restraint retractor of FIG. 6.

In operation of the load limiting seat restraint retractor 110, an occupant (not shown) grasps the latch plate 23 and pulls on the lap belt 24 and shoulder belt 26. The shoulder belt 26 is unwound by the occupant from the take-up spool 136. The occupant engages the latch plate 23 with the buckle assembly 28 to restrain the occupant in the seat 18. When the vehicle 14 experiences a frontal impact or collision-indicating condition of at least a predetermined threshold level, the rapid deceleration causes the occupant to move forward and place a load on the webbing attached to the load limiting seat restraint retractor 110. As a result, the seat restraint retractor 110 locks and the locking pawl 144 is activated by the inertia locking and engages the ratchet 140. As webbing is pulled off the take-up spool 136, the nut 146, torsion bar 138, and take-up spool 136 rotate together and cause twisting and deformation of the torsion bar 138. Relative motion will occur between the take-up spool 136, cutters 160, and the ratchet 140. Since relative motion occurs between the cutters 160 and the take-up spool 136, the cutters 160 will cause deformation and the cutting edge 160c cuts a "groove" 150 on an inside bearing surface of the take-up spool 136. Deformation of the torsion bar 138 and the take-up spool 136 results in a higher peak load for approximately one revolution of the take-up spool 136 as shown by the curve 300 for the load limiting seat restraint retractor 110 as compared to the curve 302 for a standard conventional load limiting retractor (not shown) in the graph of FIG. 8. As the take-up spool 136 continues to rotate, the load will decrease as the cutters 160 reduce the amount of deformation to the take-up spool 136. It should be appreciated that the load limiting seat restraint retractor 110 has digressive load limiting to payout seat belt webbing and allow the occupant to decelerate with the vehicle 14.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A load limiting seat restraint retractor for a seat restraint system in a vehicle comprising:

a housing for operative connection to vehicle structure;

a take-up spool operatively connected to said housing and connected to a webbing of a seat restraint system for winding and unwinding the webbing;

a rotatable torsion bar operatively connected to said housing to provide a constant load limiting on the webbing during an impact, said take-up spool being mounted on said torsion bar;

a locking mechanism operatively connected to said torsion bar and said housing; and a load limiting device disposed between said locking mechanism and said take-up spool being rotatable with said torsion bar and fixed against axial movement relative to said torsion bar to cause deformation of a groove in a surface of said take-up spool to provide digressive load limiting on the webbing during the impact.

2. A load limiting seat restraint retractor as set forth in claim 1 wherein said locking mechanism comprises a ratchet connected to said torsion bar.

3. A load limiting seat restraint retractor as set forth in claim 2 wherein said ratchet has a plurality of teeth spaced circumferentially thereabout.

4. A load limiting seat restraint retractor as set forth in claim 3 including a pawl for engagement and disengagement with said ratchet wherein said pawl extends radially relative to said ratchet to engage said teeth on said ratchet.

5. A load limiting seat restraint retractor as set forth in claim 3 wherein said ratchet includes a cavity for receiving one end of said torsion bar.

6. A load limiting seat restraint retractor as set forth in claim 2 including a slot extending into said ratchet and said take-up spool.

7. A load limiting seat restraint retractor for a seat restraint system in a vehicle comprising:

a housing for operative connection to vehicle structure;

a take-up spool operatively connected to said housing and connected to a webbing of the seat restraint system for winding and unwinding the webbing;

a rotatable torsion bar operatively connected to said housing to provide a constant load limiting on the webbing during an impact, said take-up spool being mounted on said torsion bar;

a locking mechanism comprising a ratchet connected to said torsion bar;

a load limiting device disposed between said locking mechanism and said take-up spool to cause deformation of a groove in a surface of said take-up spool to provide digressive load limiting on the webbing during the impact;

a slot extending into said ratchet and said take-up spool; and said load limiting device comprising a key disposed between said ratchet and said take-up spool and extending into said slot.

8. A load limiting seat restraint retractor for a seat restraint system in a vehicle comprising:

a housing for operative connection to vehicle structure;

a take-up spool operatively connected to said housing and connected to a webbing of the seat restraint system for winding and unwinding the webbing;

a rotatable torsion bar operatively connected to said housing to provide a constant load limiting on the webbing during an impact, said take-up spool being mounted on said torsion bar;

a locking mechanism comprising a ratchet connected to said torsion bar;

a load limiting device disposed between said locking mechanism and said take-up spool to cause deformation of a groove in a surface of said take-up spool to provide digressive load limiting on the webbing during the impact;

a slot extending into said ratchet and said take-up spool; and said load limiting device comprising a pin disposed between said ratchet and said take-up spool and extending into said slot.

9. A load limiting seat restraint retractor for a seat restraint system in a vehicle comprising:

a housing for operative connection to vehicle structure;

a take-up spool operatively connected to said housing and connected to a webbing of the seat restraint system for winding and unwinding the webbing;

a rotatable torsion bar operatively connected to said housing to provide a constant load limiting on the webbing during an impact, said take-up spool being mounted on said torsion bar;

a locking mechanism comprising a ratchet connected to said torsion bar;

a load limiting device disposed between said locking mechanism and said take-up spool to cause deformation of a groove in a surface of said take-up spool to provide digressive load limiting on the webbing during the impact;

a slot extending into said ratchet and said take-up spool; and said load limiting device comprising at least one cutter disposed between said ratchet and said take-up spool and extending into said slot.

10. A load limiting seat restraint retractor as set forth in claim 2 wherein said take-up spool is disposed over said torsion bar and connected to the webbing, said ratchet being connected to said torsion bar.

11. A load limiting seat restraint retractor for a seat restraint system in a vehicle comprising:

a housing for operative connection to vehicle structure;

a take-up spool operatively connected to said housing and connected to a belt of the seat restraint system for winding and unwinding the belt;

a rotatable torsion bar operatively connected to said housing to provide a constant load limiting on the belt during an impact, wherein said take-up spool is disposed over said torsion bar and connected to the belt;

a locking mechanism including a ratchet connected to said torsion bar; and a load limiting device disposed between said locking mechanism and said take-up spool being rotatable with said torsion bar and fixed against axial movement relative to said torsion bar to cause deformation of a groove in a surface of said take-up spool to provide digressive load limiting on the belt during the impact.

12. A load limiting seat restraint retractor as set forth in claim 11 wherein said ratchet has a plurality of teeth spaced circumferentially thereabout.

13. A load limiting seat restraint retractor as set forth in claim 12 including a pawl for engagement and disengagement with said ratchet wherein said pawl extends radially relative to said ratchet to engage said teeth on said ratchet.

14. A load limiting seat restraint retractor as set forth in claim 11 wherein said ratchet includes a cavity for receiving one end of said torsion bar.

15. A load limiting seat restraint retractor as set forth in claim 11 including a nut for receiving one end of said torsion bar and connected to said take-up spool.

16. A load limiting seat restraint retractor as set forth in claim 11 including a slot extending into said ratchet and said take-up spool.

17. A load limiting seat restraint retractor for a seat restraint system in a vehicle comprising:

a housing for operative connection to vehicle structure;

a take-up spool operatively connected to said housing and for connection to a belt of the seat restraint system for winding and unwinding the belt;

a rotatable torsion bar operatively connected to said housing to provide a constant load limiting on the belt during an impact, wherein said take-up spool is disposed over said torsion bar and connected to the belt;

a locking mechanism including a ratchet connected to said torsion bar;

a load limiting device disposed between said locking mechanism and said take-up spool to cause deformation of a groove in a surface of said take-up spool to provide digressive load limiting on the belt during the impact;

a slot extending into said ratchet and said take-up spool; and said load limiting device comprising a key disposed between said ratchet and said take-up spool and extending into said slot.

18. A load limiting seat restraint retractor for a seat restraint system in a vehicle comprising:

a housing for operative connection to vehicle structure;

a take-up spool operatively connected to said housing and for connection to a belt of the seat restraint system for winding and unwinding the belt;

a rotatable torsion bar operatively connected to said housing to provide a constant load limiting on the belt during an impact, wherein said take-up spool is disposed over said torsion bar and connected to the belt;

a locking mechanism including a ratchet connected to said torsion bar;

a load limiting device disposed between said locking mechanism and said take-up spool to cause deformation of a groove in a surface of said take-up spool to provide digressive load limiting on the belt during the impact;

a slot extending into said ratchet and said take-up spool; and said load limiting device comprising a pin disposed between said ratchet and said take-up spool and extending into said slot.

19. A load limiting seat restraint retractor for a seat restraint system in a vehicle comprising:

a housing for operative connection to vehicle structure;

a take-up spool operatively connected to said housing and for connection to a belt of the seat restraint system for winding and unwinding the belt;

a rotatable torsion bar operatively connected to said housing to provide a constant load limiting on the belt during an impact, wherein said take-up spool is disposed over said torsion bar and connected to the belt;

a locking mechanism including a ratchet connected to said torsion bar;

a load limiting device disposed between said locking mechanism and said take-up spool to cause deformation of a groove in a surface of said take-up spool to provide digressive load limiting on the belt during the impact;

a slot extending into said ratchet and said take-up spool; and said load limiting device comprising at least one cutter disposed between said ratchet and said take-up spool and extending into said slot.

20. A seat restraint system for a vehicle comprising:

a belt webbing;

a retractor housing for operative connection to vehicle structure;

a rotatable torsion bar rotatably connected to said retractor housing to provide a constant load limiting on said belt webbing during an impact and a take-up spool mounted on said torsion bar and connected to said belt webbing for winding and unwinding said belt webbing;

a locking mechanism operatively connected to said torsion bar and said housing; and a load limiting device disposed between said locking mechanism and said take-up spool being rotatable with said torsion bar and fixed against axial movement relative to said torsion bar to cause deformation of a groove in a surface of said take-up spool to provide digressive load limiting on said belt webbing during the impact.

* * * * *